United States Patent Office

2,901,466
Patented Aug. 25, 1959

2,901,466

LINEAR POLYESTERS AND POLYESTER-AMIDES FROM 1,4-CYCLOHEXANEDIMETHANOL

Charles J. Kibler, Alan Bell, and James G. Smith, Kingsport, Tenn., assignors to Eastman Kodak Company, Rochester, N.Y., a corporation of New Jersey No Drawing. Application December 22, 1955
Serial No. 554,639

32 Claims. (Cl. 260—75)

This invention relates to highly polymeric linear condensation polymers prepared by condensing either or both of cis or trans-1,4-cyclohexanedimethanol with one or more bifunctional reactants. A particular embodiment of this invention relates to highly polymeric linear polyesters and polyester-amides prepared by condensing (1) either or both of cis or trans-1,4-cyclohexanedimethanol alone or with one or more other bifunctional reactants with (2) one or more bifunctional carboxy compounds.

Among the higher melting especially advantageous products of this invention is the condensation product derived from either or both isomers of 1,4-cyclohexanedimethanol condensed with terephthalic acid. Both high and low melting linear condensation polymers can be prepared from either isomer of 1,4-cyclohexanedimethanol. The higher melting polymers, especially polyesters and modified polyesters, are especially advantageous for the preparation of fibers and films. Films from the higher melting polymers are useful as a support for photographic emulsions of either the black-and-white or color types. Fabrics of excellent quality can be prepared from the fibers. The polymers melting at between 100° and 200° C. are especially useful in molding compositions. This invention also relates to the processes involved in the preparation of linear condensation polymers from 1,4-cyclohexanedimethanol. It also relates to films, fibers and other products produced from these polymers.

Polyesters derived from trans-quinitol and straight chain dicarboxylic acids are known to have high melting points and to have utility for forming fibers, films and the like. However, trans-quinitol has been found to be useless for condensation with a carbocyclic acid such as trans-hexahydroterephthalic acid or terephthalic acid since the produit becomes thermally degraded or forms an infusible solid during the condensation process. These condensation products cannot be polymerized by known means so as to produce polymers which can be used to form fibers and films. Moreover, cis-quinitol has been found to form a polyester with terephthalic acid which is not fiber forming and is relatively low melting. In addition, even the polyester derived from the condensation of terephthalic acid and p-xylene-$\alpha,\alpha'$-diol melts at only about 253° C. A study of the structure of the molecules of 1,4-cyclohexanedimethanol, quinitol and p-xylene-$\alpha,\alpha'$-diol further shows that the present invention represents a most unexpected improvement over the prior art.

It was most surprising to find that the actual melting point of polycyclohexylenedimethylene terephthalate (trans isomer) is 315°–320° C. (approximately a hundred degrees higher than would have been anticipated). Moreover, the melting point of the analogous polyester derived from the cis isomer is also unexpectedly high (260°–267° C.) and it also is both fiber and film forming.

The polyesters containing mixtures of the cis and trans isomers melt at about 250° C. or higher; those with as little as 25–30% of the trans isomer melt at 275°–287° C. Polyesters which contain more than 50% of the trans isomer melt at 30°–60° C. higher than polyethylene terephthalate. Polyesters containing more than about 25% of the trans isomer have melting points high enough to permit modification of the polyester composition so as to include up to about 15–25 mole percent or more of another bifunctional dicarboxylic acid in lieu of a corresponding amount of terephthalic or related acid (for example, sebacic acid, dimethylmalonic acid, succinic acid, etc.) whereby the modified polyesters still have melting points as high as 260°–290° C. or higher. Such modified polyesters can be spun and formed into oriented fibers which have sticking temperatures of 200°–240° C. or higher which are very desirable in fabrics having good ironing qualities. Another advantage possessed by such modified polyesters is that fibers and fabrics therefrom have improved dyeing qualities which permit dyeing to deep shades without the use of a carrier as is ordinarily necessary for polyethylene terephthalate.

In addition to their unexpectedly high melting points, the polyesters of this invention have remarkably improved stability contrasted to other highly polymeric linear polyesters such as polyethylene terephthalate. Thus, a 5 mil film specimen of poly-trans-1,4-cyclohexylenedimethylene terephthalate has been tested by exposure for 630 hours in a modified Weather-Ometer and found to lose none of its initial high inherent viscosity whereas under the same conditions a similar film specimen of polyethylene terephthalate lost 30% of its original inherent viscosity. Similar excellent results have been obtained employing the modified polyesters of this invention.

Moreover, polyesters prepared in accordance with this invention have unusually good heat-distortion temperature characteristics which are unexpectedly superior to the same characteristics in the corresponding polyesters wherein a straight chain polymethylene glycol is employed such as in polyethylene terephthalate. Thus, a specimen of polyethylene terephthalate had a heat-distortion temperature (averaged in two directions) of 160° C. whereas the polyester derived by condensing 1,4-cyclohexanedimethanol (75% trans isomer) with a mixture of dimethyl terephthalate and dibutyl isophthalate had a heat-distortion temperature (averaged in two directions) of 210° C.

Polyester-amides derived from 1,4-cyclohexanedimethanol also exhibit improved properties and characteristics. The polyester-amides are described in further detail hereinbelow and are analogous in many respects to the corresponding polyesters of which they are a modification.

It is an object of this invention to provide novel highly polymeric linear polyesters, polyester-amides and other related highly polymeric linear condensation polymers derived from 1,4-cyclohexanedimethanol.

It is a further object to provide such condensation polymers from which fibers can be prepared which can be employed in the manufacture of improved fabrics of excellent stability, dye receptivity, ironing characteristics, and other valuable properties.

Another object of this invention is to provide new and improved condensation polymers as just mentioned which can be formed into films having improved melting points, tensile strength, resistance to heat distortion, stability, etc.

A still further object of this invention is to provide similar new and improved condensation polymers suitable for the manufacture of molded products.

An additional object of this invention is to provide new and improved processes for preparing such condensation polymers using a substantial proportion of 1,4-cyclohexanedimethanol.

Other objects will become apparent from the description herein and the claims which follow.

According to an especially advantageous embodiment of this invention, the above and other objects can be attained by a process whereby new and improved highly polymeric linear polyesters and polyester-amides can be prepared by a process comprising condensing (1) either the cis or the trans isomer or a mixture of these isomers of 1,4-cyclohexanedimethanol alone or mixed with another bifunctional reactant with (2) a bifunctional carboxy compound.

The products of this invention are highly polymeric linear condensation polymers selected from the group consisting of polyesters and polyester-amides, which contain in the molecular structure a substantial proportion of recurring groups having the following structural formula:

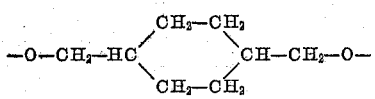

wherein the substituted cyclohexane ring is selected from the group consisting of the cis and trans isomers thereof.

The bifunctional reactants which can be employed in accordance with this invention contain no other reactive (functional) substituents which would interfere with the formation of a highly polymeric linear polymer when condensed with 1,4-cyclohexanedimethanol or a mixture thereof with such bifunctional reactants. These bifunctional reactants adapted for the preparation of linear condensation polymers are quite well known in the prior art and are profusely illustrated by the numerous patents describing polyesters, polyesteramides, other modified polyesters, polycarbonates, block polymer modifications of these condensation polymers, etc. Many examples are given hereinbelow.

The methods available for condensing 1,4-cyclohexanedimethanol with a bifunctional reactant to form a highly polymeric linear polyester or polyester-amide are unique insofar as regards the employment of 1,4-cyclohexanedimethanol either as its cis or trans isomer or as a mixture thereof. Methods for forming highly polymeric linear condensation polymers such as polyesters, etc., are illustrated by the same patent art previously referred to; thus, any of the methods known to the art can be used.

When the term 1,4-cyclohexanedimethanol or its structural formula appears herein without designation as to the isomer it includes either isomer or a mixture thereof. The letters CHDM are an abbreviation and have the same meaning.

The 1,4-cyclohexanedimethanol employed in any of the processes for making condensation polymers can be used in combination with an additional bifunctional coreactant such as when employing a mixture of glycols (advantageously the 1,4-cyclohexanedimethanol amounts to a substantial proportion, preferably at least 50 mole percent of the total of such coreactants employed although smaller proportions can also be used). The various bifunctional coreactants which can be employed in admixture with 1,4-cyclohexanedimethanol include other glycols and compounds which do not necessarily react with a glycol, e.g. an aminoalcohol. Such coreactants also include diamines, or aminocarboxy compounds. Such coreactants, including glycols, are well known in the art and are illustrated by the patent art referred to above as well as in the examples hereinbelow.

The bifunctional reactants containing functional groups which can be condensed with 1,4-cyclohexanedimethanol (or mixtures thereof with coreactants as discussed above) are bifunctional compounds capable of inter-reaction (condensation) so as to form highly polymeric linear condensation polymers. Such bifunctional compounds can be solely inter-reactive with a glycol, e.g. a dicarboxylic acid or they can be both (a) coreactive in the sense that they can be used in lieu of or as a partial replacement of the glycol in a polyester, and (b) inter-reactive in the sense that they condense with a glycol or a bifunctional compound which can be employed in lieu of a glycol. Thus, 6-aminocaproic acid is both (a) coreactive in that the amino group is of the type which can be used in lieu of a hydroxy radical of a glycol, and (b) inter-reactive in the sense that the carboxylic group will react with the hydroxy of a glycol or the amine of a bifunctional compound which can be used in lieu of a glycol. The bifunctional compounds which are solely inter-reactive with a glycol include dicarboxylic acids, carbonates, etc. The other bifunctional inter-reactive compounds include aminocarboxy compounds, or hydroxycarboxy compounds.

In forming the highly polymeric linear condensation polymers of this invention those persons having ordinary skill in this art will readily perceive the various types of polymeric compositions which can be prepared employing 1,4-cyclohexanedimethanol. Several types are more specifically described hereinbelow.

The products of this invention include highly polymeric linear condensation polymers having a molecular structure comprising recurring units having the following formula:

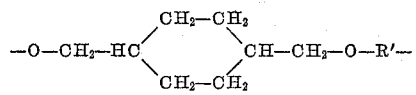

wherein the cyclohexane ring is selected from the group consisting of the cis and trans isomers thereof and R' represents an organic radical containing from 1 to 20 carbon atoms which is derived from a bifunctional carboxy compounds, e.g. R' can be the dehydroxylated residue derived from a bifunctional carboxylic acid which in this more restricted sense can be designated as R'''. Neither R' or R''' are necessarily the same in each repeating unit.

The broad range of polymers just defined includes those which have melting points as low as about 100° C. and as high as about 330° C. Those highly polymeric linear polyesters and polyester-amides melting below about 200° C. are primarily useful for the preparation of molding compositions. They can be advantageously extruded to form various shaped objects such as rods, tubes, sheets, etc. They can also be compression molded or otherwise formed into any desired shape.

Those polyesters and polyester-amides which melt at above about 200° C. have similar utility but are especially advantageous for the preparation of fibers and films having unusual value. Preferred polyesters are produced when a substantial proportion of the glycol is trans-1,4-cyclohexanedimethanol and a major proportion of the bifunctional carboxy compound is a hexacarbocyclic dicarboxylic compound as defined below.

POLYESTERS

According to a more particular embodiment of this invention, highly polymeric, high melting linear polyesters can be prepared by condensing either the cis or trans isomer (or a mixture thereof) of 1,4-cyclohexanedimethanol with a hexacarbocyclic dicarboxylic acid (including esters or acid halides thereof) so as to produce a highly polymeric, high melting linear polyester having a molecular structure principally containing recurring units having the following formula:

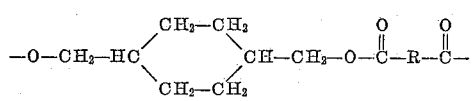

wherein the substituted cyclohexane ring is selected from the group consisting of the cis and trans isomers thereof and R represents an organic radical containing from 6 to 20 carbon atoms which is the decarboxylated residue derived from a hexacarbocyclic dicarboxylic acid wherein the carboxy radicals are attached to a hexacarbocyclic nucleus in a para relationship.

According to another more specific embodiment of this invention there is provided a highly polymeric, linear polyester having a modified molecular structure which (1) contains a substantial proportion of recurring units having the following formula:

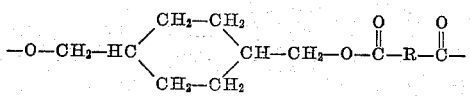

wherein the substituted cyclohexane ring is selected from the group consisting of the cis and trans isomers thereof and R represents an organic radical containing from 6 to 20 carbon atoms which is the decarboxylated residue derived from a hexacarbocyclic dicarboxylic acid wherein the carboxy radicals are attached to a hexacarbocyclic nucleus in a para relationship, and (2) contains intermittent recurring units which are the same as the principal recurring units in a different highly polymeric, linear polyester derivable from a bifunctional dicarboxylic acid and a bifunctional glycol.

These modified linear polyesters can be produced by well-known methods by condensing 1,4-cyclohexanedimethanol with a mixture of the defined hexacarbocyclic dicarboxylic acid (or derivative thereof) and another dicarboxylic acid adapted to the formation of highly polymeric linear polyesters. These modified highly polymeric linear polyesters can also be prepared by condensing a mixture of 1,4-cyclohexanedimethanol and another bifunctional glycol with one or more of the defined bifunctional hexacarbocyclic dicarboxylic acids. Other combinations which can be condensed are apparent. The modified linear polyesters of this more particular embodiment having the highest melting points are preferably prepared by condensing at least 50 mole percent of 1,4-cyclohexanedimethanol (50–100%) and up to 50 mole percent of another bifunctional glycol (0–50%), with a bifunctional dicarboxylic composition wherein at least 50 mole percent thereof is a hexacarbocyclic dicarboxylic compound (50–100%) and up to 50 mole percent thereof is another bifunctional dicarboxylic compound (0–50%). Of course, smaller proportion of CHDM or hexacarbocyclic dicarboxylic compound can be employed. Obviously, the polymers of this invention will be derived from a substantial proportion of CHDM so as to produce a polymer having characteristics definitely reflecting the improvements contributed by the presence of CHDM.

Accordingly, as a higher melting embodiment of this invention there is provided a highly polymeric linear polyester containing recurring units of the type just described hereinabove as (1) which also contains up to 50 mole percent of recurring units described in (2) hereinabove having the following formula:

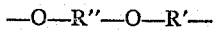

wherein R' has been previously defined and R" represents an organic radical containing from 2 to 20 carbon atoms which is the dehydroxylated residue derived from a bifunctional glycol.

Other embodiments of this invention will also be apparent to those skilled in the art.

The bifunctional dicarboxylic acids and related compounds which can advantageously be employed include, in addition to the free acids, the various alkyl, aryl or other esters thereof, acid halides thereof and anhydrides thereof.

The 1,4-cyclohexanedimethanol employed can be used in the form of either of its isomers or a mixture thereof.

The 1,4-cyclohexanedimethanol or any of the other glycols can be employed as esters thereof (such as esters of a lower alkanoic acid). However, it is generally advantageous to employ the free glycol.

The condensation reaction can be advantageously facilitated by the employment of a catalyst. The best catalyst for each reaction is determined by the nature of the reactants. Generally, when an alkyl ester of the acidic compound is being employed, an ester interchange type of catalyst is to be preferred. Numerous patents have issued in the last few years describing numerous advantageous catalysts which can be employed. Various techniques as to the use of the catalysts are well known in the art. For example, if the free acid is being reacted with the free glycol, a catalyst is generally not added until after the preliminary condensation has gotten under way.

The reaction is generally begun in the presence of an excess of the glycol and initially involves heating to a temperature sufficient to cause a preliminary condensation followed by the evaporation of excess glycol. The entire reaction is conducted with agitation under an inert atmosphere. The temperature can then be advantageously increased with or without the immediate application of a vacuum. As the temperature is further increased, the pressure can be advantageously greatly reduced and the condensation allowed to proceed until the desired degree of polymerization is achieved. The product can be considered finished at this stage or it can be subjected to further polymerization in the solid phase in accordance with well-known techniques. Thus, the highly polymeric condensation product produced as just described can be cooled, pulverized, and the powder heated to a temperature somewhat less than that employed during the last stage of the molten phase polymerization thereby avoiding coagulation of the solid particles. The solid phase polymerization is advantageously conducted until the desired degree of polymerization is achieved. The solid phase polymerization, among other things, results in a higher degree of polymerization without the accompanying degradation which frequently takes place when continuing the last stage of the melt phase polymerization at a temperature high enough to achieve the desired degree of polymerization. The solid phase process is advantageously conducted with agitation employing an inert atmosphere at either normal atmospheric pressure or under a greatly reduced pressure.

Examples of hexacarbocyclic dicarboxylic acids wherein the carboxy radicals are attached to a hexacarbocyclic nucleus in para relationship include terephthalic acid, trans-hexahydroterephthalic acid, p,p'-sulfonyldibenzoic acid, 4,4'-diphenic acid, 4,4'-benzophenonedicarboxylic acid, 1,2-di(p-carboxyphenyl)ethane, 1,2-di(p-carboxyphenoxy)ethane, 4,4'-dicarboxydiphenyl ether, etc. All of these acids contain at least one hexacarbocyclic nucleus. Fused rings can also be present such as in 1,4- or 1,5-naphthalenedicarboxylic acid. The hexacarbocyclic dicarboxylic acids are preferably those containing a trans-cyclohexane nucleus or an aromatic nucleus containing from one to two benzene rings of which at least one has the usual benzenoid unsaturation. Of course, either fused or attached rings can be present. All of the compounds named in this paragraph come within the scope of this preferred group.

Examples of other bifunctional dicarboxylic organic acids which are adapted to the formation of linear polyesters and which can be employed in accordance with this invention as described above include oxalic acid, carbonic acid, succinic acid, adipic acid, sebacic acid, azelaic acid, α-ethylsuberic acid, α,α-diethyladipic acid, dimethylmalonic acid, dicarboxy diethyl ether, isophthalic acid, orthophthalic acid, hexahydro-orthophthalic acid, etc. Carbonic acid is an obvious equivalent included among these other acids.

In addition to mixtures of dicarboxylic organic acids, the polyesters defined in this invention can also be modified by the employment of hydroxy acids such as hydroxypivalic acid, hydroxybutyric acid, hydroxycaproic acid, p-hydroxybenzoic acid, etc.

Examples of modifying glycols which can be employed in accordance with this invention include the polymethylene glycols containing from 2 to 10 or more carbon atoms such as ethylene glycol, 1,5-pentanediol, 1,10-decanediol, and other glycols of this series as well as the ether glycols such as diethylene glycol, triethylene glycol, etc. Branched chained aliphatic glycols which can be employed include 2,2-dimethyl-1,3-propanediol, 2-methyl-1,5-pentanediol, etc. Carbocyclic glycols can also be employed such as 1,4-di(hydroxyethyl)benzene. Other glycols which can be employed include various derivatives of those already mentioned which contain nitrogenous substituents or numerous other substituents which do not interfere with the formation of a highly polymeric linear polyester. Those familiar with the art will be aware of the effect of various substituents on melting points and other properties of the polyesters produced. It is well known that there is quite a variety of these glycols available for the preparation of linear polyesters.

The polyesters of this invention which contain a mixture of dicarboxylic organic acids have unexpectedly high melting points for modified polyesters of this character and in addition have improved dyeing qualities whereby fibers can be prepared which can be woven into fabrics which dye to deep shades without the use of a carrier as is generally employed with polyethylene terephthalate dyeing procedures.

The linear polyester compositions of this invention are generally characterized by superior weathering properties and resistance to moisture whereby the products having from the higher down to the relatively low melting points are markedly more efficacious than the products produced from glycols other than 1,4-cyclohexanedimethanol.

The methods of forming the polyesters of this invention into fibers and films are well known in the art and need no elaboration herein; in brief, the polyesters of this invention can be heated and melt extruded followed by quenching, drawing, and heat setting employing techniques that are described in the prior art.

This invention can be further illustrated by the following examples of preferred embodiments, although it will be understood that these examples are included merely for purposes of illustration and are not intended to limit the scope of the invention unless otherwise specifically indicated:

*Example 1.—CHDM (65–70% trans)+terephthalic acid*

Nineteen and four tenths grams of dimethyl terephthalate (0.1 mole), 28.8 g. of 1,4-cyclohexanedimethanol (0.2 mole of what is between 65 and 70% trans isomer) and 16 drops of a 14.4% solution of $NaHTi(OC_4H_9)_6$ in n-butanol were placed in a flask and heated with stirring to 190–200° C. The ester interchange was rapid and as soon as the methanol had all distilled out of the reaction mixture (about 20 minutes) the temperature was rapidly increased to about 270° C. The reaction was then put under reduced pressure (about 1 mm.) and the temperature raised to 300–310° C. over a 1½ hour period. The reaction became more viscous but remained colorless. The reaction mixture was then let down to atmospheric pressure with nitrogen and the resulting polymer removed. The resulting white opaque solid had a crystalline melting point of 290–300° C. and an inherent viscosity of 0.78. Fibers could be drawn from the melt. These fibers were strong and could be drafted.

*Example 2.—CHDM (65–70% trans)+terephthalic acid*

The process described in Example 1 was repeated except that a prepolymer was prepared by maintaining the vacuum for only 10 minutes with a melt temperature of 265–270° C. The resulting melt was poured into water and the colorless polymer ground to a powder. This powder could readily be crystallized by heat or by acetone. The prepolymer was built up by solid phase vacuum technique at 260° C. to an inherent viscosity of 0.79. The melting point of the polyester was 295–305° C.

*Example 3.—CHDM (60–65% trans)+terephthalic acid+sebacic acid*

The process in Example 1 was repeated except that 15.5 g. (0.08 mole) of dimethyl terephthalate, 6.28 g. (0.02 mole) of dibutyl sebacate, 28.8 g. (0.2 mole) of 1,4-cyclohexanedimethanol (60–65% trans isomer) and 16 drops of a 14.4% solution of $NaHTi(OBu)_6$ in butanol were used. The resulting white opaque polyester had a melting point of 265–275° C. and an inherent viscosity of 0.85.

*Example 4.—CHDM (60–65% trans)+sulfonyldibenzoic acid+sebacic acid*

Four and nineteen hundredths grams (0.01 mole) of dibutyl p,p'-sulfonyldibenzoate, 4.71 g. (0.015 mole) of dibutyl sebacate, 7.2 g. (0.05 mole) of 1,4-cyclohexanedimethanol (60–65% trans isomer) and 4 drops of 14.4% solution of $NaHTi(OBu)_6$ in butanol were reacted in a manner similar to that described in Example 1. A rubbery polyester was obtained with an inherent viscosity of 0.95. This polyester had a melting point of about 200° C. and the resulting fibers which were obtained were very rubbery.

*Example 5.—CHDM (60–65% trans)+sulfonyldibenzoic acid+sebacic acid*

Six and twenty-nine hundredths grams (0.015 mole) of dibutyl p,p'sulfonyldibenzoate, 3.14 g. (0.01 mole) of dibutyl sebacate, 7.2 g. (0.05 mole) of 1,4-cyclohexanedimethanol (60–65% trans) and 4 drops of a 14.4% solution of $NaHTi(OBu)_6$ in butanol were reacted in a manner similar to that described in Example 1. A polyester was obtained with an inherent viscosity of 0.87. This polyester had a melting point of 245–50° C. The resulting fibers from this polyester were rubbery but not so pronounced as in the polyester of Example 4.

*Example 6.—CHDM+sulfonyldibenzoic acid*

A prepolymer was prepared in the usual manner from 10.5 g. (0.025 mole) of dibutyl p,p'-sulfonyldibenzoate, 7.20 g. (0.05 mole) of 1,4-cyclohexanedimethanol and 4 drops of 14.4% $NaHTi(OBu)_6$ in butanol. The resulting prepolymer had a melting point of 283–287° C. and was built by the usual vacuum solid phase technique at 260° C. to a polymer with a viscosity of 0.76. The melting point of the built polymer was 295–8° C.

*Example 7.—CHDM (100% trans)+terephthalic acid*

A mixture of 77.6 g. (0.4 mole) of dimethyl terephthalate, plus 86.4 g. (0.6 mole) of trans-1,4-cyclohexanedimethanol, M.P. 66–67° C. [Haggis and Owen, J. Chem. Soc., 404–7 (1953)] and 1.2 ml. of a 14.4% solution of $NaHTi(OBu)_6$ in butanol was heated rapidly with stirring to 250° C. The ester interchange required 30 minutes and the temperature was allowed to rise simultaneously to 290° C. The temperature was increased to 325° C. and a vacuum of 1.0 mm. of mercury was applied. The melt was stirred under vacuum at 320–330° C. for 40 minutes. The colorless melt was cooled under nitrogen giving a highly crystalline product which melted at 315–320° C. The inherent viscosity (60:40 phenol:tetrachloroethane) of the polyester which could be spun into fibers of good strength was 0.75.

*Example 8.—CHDM (100% cis)+terephthalic acid*

The process of Example 7 was repeated except that cis-1,4-cyclohexanedimethanol was used. The resulting white prepolymer was polymerized in the solid phase at 240° C. for 3 hours at a pressure of 0.05 mm. The white polyester with an inherent viscosity of 0.84 melted at 255–263° C. and could be spun into fibers which could be oriented by cold drawing. The oriented fibers had a tenacity of 3.0–4.0 g. per den.

*Example 9.—CHDM (50% cis)+terephthalic acid*

A mixture of 3.98 g. (0.02 mole) of dimethyl terephthalate, 3.16 g. (0.022 mole; 10% excess) of 1,4-cyclohexanedimethanol (which was approximately 50% the cis form) and 1 drop of a 14.4% solution of $NaHTi(OBu)_6$ in butanol was heated quickly to 200° C.

The mixture boiled rapidly at this point and methanol distilled. The temperature was raised during 45 minutes to 290–300° C. and a vacuum was carefully applied. After 5 minutes at 1.0 mm. or less, the clear melt was cooled. The inherent viscosity of the prepolymer was 0.20. Polymerization of pulverized prepolymer at 260° C. under 0.1 to 0.05 mm. pressure for 3 hours gave a polyester with an inherent viscosity of 0.96. The final viscosity may be controlled by varying the time of heating, e.g., 2 hours at 260° C. and 0.07 mm. gave an inherent viscosity of 0.82. Infrared analysis indicates that this polyester contains 50 mole percent cis 1,4-cyclohexanedimethanol. The melting point was 283–287° C.

*Example 10.—CHDM (50% cis) +terephthalic acid*

A prepolymer prepared as in Example 9 except that 4.32 g. (0.03 mole; 50% excess) of 1,4-cyclohexanedimethanol (50% cis) was used. The pulverized prepolymer was polymerized in the solid phase at 260° C. for 3 hours at 0.07 mm. pressure. The trans form of the diol enters the polyester preferably as shown by the higher melting point, 293–301° C., and by the infrared analysis which indicates that the polyester is only 25% cis. The inherent viscosity was 0.89.

*Example 11.—CHDM (70–75% trans) +terephthalic acid*

A prepolymer prepared as in Example 10 except that a 50% excess of 1,4-cyclohexanedimethanol, which was 70–75% trans, was used. The pulverized prepolymer was polymerized in the solid phase at 280° C. for 3 hours at 0.07 mm. pressure. The resulting polymer has an inherent viscosity of 1.29 and melted at 308–318° C. Infrared analysis indicated that this polyester was 95–98% trans.

The following examples were run by the procedure employed in Example 9 using 3.98 g. (0.02 mole) of dimethyl terephthalate and 3.16 g. (0.022 mole) of 1,4-cyclohexanedimethanol (50% cis) but using the different catalysts as indicated in the chart. All catalysts were added as dilute solutions in alcohol or a suitable glycol:

(19.8 moles) of 1,4-cyclohexanedimethanol (40% cis) and 15 cc. of a 28.8% solution of NaHTi(OBu)$_6$ in butanol was charged in a stainless steel reactor equipped with a sweep stirrer and preheated to 170° C. The temperature was increased during 50 minutes to 240° C. and 1200–1250 cc. of distillate was collected. The temperature of the melt was increased to 270° C. and the system carefully evacuated during 30 minutes. After holding 5 minutes at .01–1.0 mm. pressure, the system was released to nitrogen and the low-molecular weight prepolymer was extruded into cold water. The dried prepolymer was pulverized to pass a 30 mesh screen. It had an inherent viscosity of 0.25 and a test polymerization at 240° C. for 3 hours at a 0.07 mm. vacuum gave a polymer with an inherent viscosity of 1.34 which melted at 269–279° C. The entire batch of this prepolymer (10 lb.) was polymerized by heating in a stainless steel reactor under 0.1 to 0.050 mm. pressure at 190–220° C. with slow stirring for 2 hours, and then maintaining at 220–225° C. for 6 hours. The inherent viscosity of the built polymer was 0.92. The prepolymer powder may alternatively be polymerized at a higher temperature for a shorter period of time, e.g., 3 hours at 240° C., 1 hour at 260° C., or 30 minutes at 270° C.

The following modified polyesters of terephthalic acid and 1,4-cyclohexanedimethanol (45–50% cis) were prepared by a procedure similar to the one given in Example 21 except that 50% excess diol was employed.

| Example Number | Mole Percent Terephthalic | Modifying Acid | Mole Percent Modifier | Prepolymer Viscosity | Solid Phase Polymerization | | | |
|---|---|---|---|---|---|---|---|---|
| | | | | | Time (hr.) | Temp., °C. | Visc. | M.P., °C. |
| 22 | 83 | succinic | 17 | 0.20 | 3 | 250 | 1.04 | 279–286 |
| 23 | 75 | do | 25 | 0.17 | 3 | 240 | 0.93 | 255–280 |
| 24 | 83 | adipic | 17 | 0.17 | 3 | 250 | 0.91 | 269–279 |
| 25 | 80 | do | 20 | 0.27 | 3 | 240 | 1.23 | 258–262 |
| 26 | 83 | azelaic | 17 | 0.22 | 3 | 240 | 1.63 | 257–267 |
| 27 | 75 | do | 25 | 0.28 | 2 | 240 | 1.04 | 267–279 |
| 28 | 83 | sebacic | 17 | 0.20 | 3 | 240 | 0.91 | 255–268 |
| 29 | 75 | do | 25 | 0.13 | 2 | 260 | 0.94 | 259–270 |
| 30 | 91 | isophthalic | 9 | 0.32 | 3 | 250 | 0.75 | 305–315 |
| 31 | 88 | do | 12 | 0.30 | 3 | 250 | 0.96 | 288–298 |
| 32 | 83 | do | 17 | 0.17 | 3 | 240 | 1.04 | 276–284 |
| 33 | 75 | do | 25 | 0.39 | 3 | 240 | 1.36 | 272–280 |
| 34 | 75 | dimethylmalonic | 25 | 0.21 | 2 | 240 | 1.30 | 262–270 |
| 35 | 75 | hydroxypivalic | 25 | 0.18 | 2 | 240 | 0.95 | 267–275 |
| 36 | 75 | hexahydroterephthalic (trans) | 25 | 0.30 | 2 | 240 | 0.94 | 260–270 |

*Example 37.—CHDM (65–70% trans) +terephthalic acid +sebacic acid*

A mixture of 6.4 lb. (15 moles) of dimethyl terephthalate, 3.45 lb. (5 moles) of dibutyl sebacate, 9.5 lb. (30 moles) of 1,4-cyclohexanedimethanol (65–70% trans) and 15 cc. of a 28.8% solution of NaHTi(OBu)$_6$ in butanol was charged in a stainless steel reactor equipped with a sweep stirrer and preheated to 170° C. The temperature was increased during 1 hour to 240° C. and 1400–1500 cc. of distillate was collected. The temperature of the melt was increased to 285° C. and a vacuum was carefully applied during 30 minutes. The

| Example Number | Catalyst | Amount of Metal, Gram | Viscosity of Prepolymer | Viscosity (3 hr. at 260° at 0.07 mm.) | M.P., °C. |
|---|---|---|---|---|---|
| 12 | Ti(OC$_4$H$_9$)$_4$ | .001 | 0.30 | 1.04 | 277–287 |
| 13 | LiAlH$_4$ | .001 | 0.20 | 0.68 | 275–287 |
| 14 | NaAlO$_2$Ca(OCOCH$_3$)$_2$ | .002 | 0.25 | 0.82 | 277–285 |
| 15 | Mg(OCH$_3$)$_2$ | .001 | 0.15 | 0.50 | 275–284 |
| 16 | NaHTi(OC$_4$H$_9$)$_6$ | .0005 | 0.23 | 0.93 | 277–286 |
| 17 | NaAlO$_2$ | .001 | 0.19 | 1.02 | 280–289 |
| 18 | NaAlO$_2$ | .0005 | | 0.83 | 276–288 |
| 19 | NaAlO$_2$ | .002 | | 0.95 | 279–288 |
| 20 | Mg(OCH$_3$)$_2$ | .002 | | 0.42 | 275–283 |

*Example 21.—CHDM (40% cis) +terephthalic acid +succinic acid*

A mixture of 6.4 lb. (15 moles) of dimethyl terephthalate, 0.65 lb. (3 moles) of succinic anhydride, 6.3 lb.

mixture was stirred under a vacuum of 0.1 to 0.05 mm. for 7.5 hours. The pressure was released to nitrogen, and the polymer extruded as a nearly colorless material which quickly crystallized. It had an inherent viscosity of 0.82 and melted at 269–279° C.

*Example 38.—CHDM (70–75% trans)+terephthalic acid*

A mixture of 6.4 lb. (15 moles) of dimethyl terephthalate, 7.1 lb. (22.5 moles) of 1,4-cyclohexanedimethanol (70–75% trans) was prepared as in Example 37 except that a final temperature of 315–320° C. was used, and it required only 35 minutes at full vacuum (0.1 mm. or less) to obtain a material with an inherent viscosity of 0.60 which melted at 305–317° C.

*Example 39.—CHDM (50% cis)+terephthalic acid +hexahydro-orthophthalic acid*

A mixture of 111.2 g. (0.4 mole) of dibutyl terephthalate, 16.0 g. (0.08 mole) of dibutyl hexahydro-orthophthalate (primarily trans isomer), 76.0 g. (0.53 moles) of 1,4-cyclohexanedimethanol (50% cis) and 1.0 ml. of a 14.4% solution of NaHTi(OBu)$_6$ in butanol was heated rapidly with stirring to 240° C. Butanol began distilling at 190° C., and by the time (45 minutes) the melt reached 240° C., 75–80 cc. of distillate was collected. The melt temperature was raised to 285° C., and a vacuum of 1.0 mm. was carefully applied and held for 5 minutes. The low-molecular weight polyester was poured into cold water and pulverized. The powder was polymerized in the solid phase by heating 3 hours at 260° C. under a 0.07 mm. pressure. The final polymer had an inherent viscosity of 0.85 and melted at 270–280° C.

*Example 40.—CHDM (50% cis)+terephthalic acid +hexahydro-orthophthalic acid*

A prepolymer was prepared as in Example 39 except that the dibutyl hexahydro-orthophthalate was replaced by dimethyl hexahydro-O-phthalate. The prepolymer was built at 260° C. for 3 hours at 0.1 mm. to an inherent viscosity of 1.02. It melted at 275–283° C.

*Example 41.—CHDM (50% cis)+terephthalic acid +hexahydro-orthophthalic acid*

A prepolymer was prepared as in Example 39 except that the catalyst was 1.0 ml. of 28.8% Ti(OBu)$_4$ in butanol. The prepolymer was built at 260° C. for 3 hours at 0.08 mm. to an inherent viscosity of 0.95.

*Example 42.—CHDM (100% trans)+trans-hexahydroterephthalic acid*

A mixture of 80.0 g. (0.4 mole) of dimethyl trans-hexahydroterephthalate, 59.0 g. (0.44 mole) of trans-1,4-cylcohexanedimethanol and 1 ml. of 14.4%

NaHTi(OBu)$_6$ in butanol was polymerized at 200–220° C. for 60 minutes. The temperature was then raised to 280° C., and a vacuum was carefully applied. The mixture was heated at 280–290° C. for 30 minutes and extruded into cold water. The resulting polymer had an inherent viscosity of 0.52 and melted at 258–263°. It was further polymerized in the solid phase at 220° C. for 3 hours to obtain fiber forming polymer with an inherent viscosity of 0.92. Useful fibers and films were formed from this polymer which were oriented and heat set.

The following examples utilize the mixed dibasic acid marketed by U.S. Industrial Chemical Company under the trademark "Isosebasic" acid as modifier. The acid is listed by the producer as having the following approximate composition:

| | Percent |
|---|---|
| α-Ethylsuberic acid | 72–80 |
| α,α'-Diethyladipic acid | 12–18 |
| Sebacic acid | 6–10 |

*Example 43*

A mixture of 6.4 lb. (15 moles) of dimethyl terephthalate, 2.06 lb. (3 moles) of diisobutyl ester of "Isosebacic" acid, 6.3 lb. (19.8 moles) of 1,4-cyclohexanedimethanol (approximately 75% trans), and 15 cc. of 28% Ti(OC$_4$H$_9$)$_4$ in butanol was charged in a stainless steel reactor equipped with a sweep stirrer and preheated to 170° C. The polymerization was carried out as in Example 21. The final polymer with an inherent viscosity of 1.05 melted at 266–269° C.

*Example 44*

A polyester prepared as in Example 43 except that an equivalent amount of "Isosebacic" acid was used in place of the diisobutyl ester of "Isosebacic" acid. The polymer obtained had an inherent viscosity of 1.15 and was the same as the one prepared in Example 43.

*Example 45*

A polyester prepared as in Example 43 except that 2 moles of "Isosebasic" acid was used for every 3 moles of dimethyl terephthalate. The polyester obtained melted at 225–235° C. and produced a rubbery yarn when spun in the conventional manner.

*Example 46.—CHDM (75% trans)+2,2-dimethylpropylene glycol+terephthalic acid*

A mixture of 66.4 g. (0.4 mole) of terephthalic acid, 43.2 g. (0.3 mole) of 1,4-cyclohexanedimethanol (75% trans), 21.0 g. (0.2 mole) of 2,2-dimethylpropanediol-1,3 and 1 ml. of 14.4% NaHTi(OBu)$_6$ in butanol was heated at 210° C. for 30 minutes and then heated at 240° C. for 45 minutes. The melt was heated to 290–295° C. and a vacuum of 1.0 mm. was carefully applied and held for 5 minutes. The resulting prepolymer had an inherent viscosity of 0.42 and was further polymerized in the solid phase at 260° C. for 3 hours at 0.08 mm. It then had an inherent viscosity of 1.06 and melted at 289–297° C.

*Example 47.—CHDM (70% trans)+ethylene glycol+terephthalic acid*

A polyester was prepared from 77.4 g. (0.4 mole) of dimethyl terephthalate, 43.2 g. (0.3 mole) of 1,4-cyclohexanedimethanol (70% trans), and 18.6 g. (0.3 mole) of ethylene glycol using 1.2 ml. of a 14.4% solution of NaHTi(OBu)$_6$ in butanol as catalyst. The resulting polyester had an inherent viscosity of 0.67 and melted at 270–280° C. Chemical analysis indicated that 1,4-cyclohexanedimethanol and ethylene glycol were present in the polyester in the ratio of 3 to 1 rather than the 1 to 1 ratio used in the original glycol mixture.

*Example 48.—CHDM (70% trans)+pentamethylene glycol+terephthalic acid*

A polyester was prepared as in Example 47 except that the modifying glycol was 1,5-pentanediol. The resulting polyester with an inherent viscosity of 0.95 melted at 289–300° C. Analysis indicated that essentially all the 1,4-cyclohexanedimethanol used in the original mixture was present in the final polymer. As in Example 47 the excess of the modifying glycol was selectively removed leaving most of the 1,4-cyclohexanedimethanol in the polymer.

*Example 49.—CHDM (40% cis)+sulfonyldibenzoic acid+succinic acid*

A mixture of 63.6 g. (0.2 mole) of dibutyl 4,4'-sulfonyldibenzoate, 4.0 g. (0.04 mole) of succinic anhydride, 4.3 g. (0.3 mole) of 1,4-cyclohexanedimethanol (40% cis) and 1 ml. of 14.4% NaHTi(OBu)$_6$ in butanol was heated for 1 hour at 200–240° C., and then the temperature was raised to 290° C. A vacuum was applied, and after heating 5 minutes at 1.0 mm., the prepolymer was extruded. The pulverized material was polymerized in the solid phase at 260° C. for 3 hours. The polymer had an inherent viscosity of 0.69 and melted at 293–300° C.

*Example 50.—CHDM (40% cis)+sulfonyldibenzoic acid+adipic acid*

A polymer was prepared as in Example 49 except that 0.04 mole of adipic acid dibutyl ester replaced the succinic anhydride. The polyester with an inherent viscosity of 1.03 melted at 290–297° C.

*Example 51.—CHDM (40% cis)+sulfonyldibenzoic acid+sebacic acid*

A polymer was prepared as in Example 49 except that the modifying acid was 0.04 mole of sebacic acid. The final polyester was an inherent viscosity of 1.25 melted at 285–297° C.

*Example 52.—CHDM (40% cis)+sulfonyldibenzoic acid+succinic acid*

A polymer was prepared as in Example 49 except that the amount of succinic anhydride was increased to 0.07 mole. The polymer with an inherent viscosity of 1.14 melted at 279–288° C.

*Example 53.—Fibers of polycyclohexylenedimethylene terephthalate*

A polymer formed by the condensation reaction of dimethyl terephthalate was 1,4-cyclohexanedimethanol was melted in a small screw-type extruder operating at a temperature of 309° C. and was forced through a 5-hole spinneret into a spinning column at room temperature. The filaments thus formed were wound on a package of conventional type at a speed of 705 feet per minute. The yarn was subsequently fed at a rate of 30 feet per minute over a roller at 120° C. to another winder running at 107 feet per minute, thus drawing the yarn 3.57 times its original length. This yarn was then heated for 10 minutes in air at 165° C. while held at constant length. After this treatment, the yarn showed a high degree of orientation and crystallinity, as indicated by X-ray diffraction patterns, and had a strength of 3 g. per den., elongation at break of 17%, and a softening temperature of 235° C.

*Example 54.—Fibers of polymer from CHDM+terephthalic acid+succinic acid*

A polymer formed by condensing a mixture of dimethyl terephthalate, succinic anhydride, and 1,4-cyclohexanedimethanol in proportions such that the polymer contained terephthalic acid and succinic acid residues in a molar ratio of 5 to 1 was melted in a screw extruder at 317° C., and forced at a rate of 4 pounds per hour through a spinneret having 50 holes each 0.3 mm. in diameter into a spinning column at room temperature. The filaments thus formed were wound on a conventional package at a rate of 1600 feet per minute. This yarn was cold-drawn 4.67 times its original length by passing it over a rotating roller heated to 120° C. at a feed rate of 30 feet per minute to a winder running at 140 feet per minute. This yarn was then heated for 10 minutes in air at 165° C. while held at constant length. The yarn thus obtained showed a high degree of crystallinity and orientation as indicated by X-ray diffraction patterns. Its strength was 4.8 grams per denier, its elongation at break was 14%, and its softening temperature was about 210° C.

*Example 55.—Films of polymer from CHDM+terephthalic acid+isophthalic acid*

A polymer formed by condensing a mixture of dimethyl terephthalate, dibutyl isophthalate and 1,4-cyclohexanedimethanol (75% trans) in proportions such that the polyester contained terephthalic and isophthalic residues in the molar ratio of 5 to 1 was extruded as film in a 1¼" Royle extruder. Samples of this film were stretched in mutually perpendicular directions and then heat set for various times.

| | Heat Treatment | Heat-Distortion Temperature Average in Two Directions, °C. |
|---|---|---|
| Sample 1 | 3 min. at 110° C.<br>5 min. at 225° C. | 175 |
| Sample 2 | Same as Sample 1+1 min. with annealing at 150° C. | 210 |

Specimens from sample 2 and various other polyesters described above which had been similarly formed into film were found quite advantageous as packaging materials and as a support for either black and white or color type photographic emulsions using the usual techniques for employing polyester films for such purposes. The inherent viscosities referred to herein were measured by standard techniques in a mixture of 40% tetrachlorethane plus 60% phenol. The symbol Bu used herein represents the n-butyl radical.

All the polymers produced as described by the above examples were formed into fibers which were oriented and heat set. These polymers were likewise formed into useful films. Fabrics were woven from the fibers and formed into useful articles of wearing apparel. Films were coated with photographic silver halide emulsions, exposed in cameras, and processed to give black-and-white and colored pictures. Extensive tests have shown all of these products to be of unexpectedly meritorious value.

The following additional examples will serve to further illustrate highly polymeric, linear polyesters containing either no hexacarbocyclic dicarboxylic organic acid or a minor proportion thereof; the numerous modifications of such polymers to form a great variety of valuable molding compositions is readily apparent:

*Example 56.—CHDM (50% cis)+carbonic acid*

A mixture of 6.35 g. (0.025 mole) of diethyl carbonate, 7.20 g. (0.050 mole) of 1,4-cyclohexanedimethanol (50% cis) and 4 drops of 14.4% NaHTi(OBu)$_6$ in butanol was heated in a suitable vessel with stirring for 1 hour at 200–250° C. The temperature was raised to 270° and a vacuum was carefully applied. After heating for 40 minutes at 270–275° C. at 0.1 mm., the polymer was extruded. The polymer obtained was colorless and could be spun into fibers which could be cold drawn. It had an inherent viscosity of 0.43 and melted in the range of 100°–130° C. This polymer was a useful molding composition which could be shaped by extrusion or compression techniques into useful articles.

*Example 57.—CHDM (50% cis)+succinic acid*

A polyester prepared as in Example 56 from 4.0 g. (0.04 mole) of succinic anhydride and 6.34 g. (0.05 mole) of 1,4-cyclohexanedimethanol with NaHTi(OBu)$_6$ as catalyst melted at 100–105° C. with softening at 45° C. It had an inherent viscosity of 0.41. This polymer was also a useful molding composition.

*Example 58.—CHDM (50% cis)+isophthalic acid*

A polyester prepared from 6.95 g. (0.025 mole) of dimethyl isophthalate, 5.33 g. (0.037 mole) of 1,4-cyclohexanedimethanol, and 4 drops of 14.4% NaHTi(OBu)$_6$ in butanol by the procedure of Example 56 had an inherent viscosity of 0.40, melted at 156–167° C. and was a useful molding material.

*Example 59.—CHDM (75–80% trans)+terephthalic acid+sebacic acid*

Seventy-eight grams of dibutyl sebacate (0.25 mole), 33.0 g. of dimethyl terephthalate (0.17 mole), 67.7 g. of 1,4-cyclohexanedimethanol (0.47 mole, 75–80% trans) and 1.37 ml. of a 9.7% solution of titanium tetrabutoxide in n-butanol were placed in a flask and heated under nitrogen with stirring to 190–200° C. After the ester interchange was complete, the temperature was raised rapidly to about 270° C. The reaction was then put under reduced pressure (about 1 mm.) and the temperature was maintained at 270±5° C. for two hours. The resultant viscous melt was let down to atmospheric pressure with nitrogen and the polymer removed. This material was a hard rubbery solid with a melting point of 170–180° C. and an inherent viscosity of 0.93. It was shaped by extrusion or compression techniques into various articles.

*Example 60.—CHDM (75–80% trans)+terephthalic acid+sebacic acid*

The process in Example 59 was repeated except that 12.2 g. of dimethyl terephthalate (0.063 mole) and 78.0 g. (0.25 mole) of dibutyl sebacate was used. The resulting rubbery polymer had a melting point of 135–145° C. and an inherent viscosity of 1.2. It had utility similar to that of Example 59.

*Example 61.—CHDM (75–80% trans)+sulfonyldibenzoic acid+sebacic acid*

A mixture of 100.5 g. of dibutyl p,p'-sulfonyldibenzoate (0.24 mole), 113.0 g. of dibutyl sebacate (0.36 mole), 95.0 g. of 1,4-cyclohexanedimethanol (0.66 mole, 75–80% trans) and 1.9 ml. of a 14.4% solution of NaHTi(OBu)$_6$ in n-butanol was heated with stirring at 200–220° C. until butanol no longer distilled (one hour). The temperature was raised to 260±5° C. and the pressure reduced to 1 mm. of mercury. After two hours the viscous melt was cooled and let down to atmospheric pressure. The rubbery polymer had a melting point of 180–185° C. and an inherent viscosity of 0.85. It was formed into various shaped articles.

*Example 62.—CHDM (75–80% trans)+sulfonyldibenzoic acid+sebacic acid*

The process of Example 61 was repeated with a mixture of 37.7 g. of dibutyl p,p'-sulfonyldibenzoate (0.09 mole), 113.0 g. of dibutyl sebacate (0.36 mole) and 72.0 g. of 1,4-cyclohexanedimethanol (0.50 mole, 75–80% trans). The final polymer had an inherent viscosity of 1.03 and a melting point of 130–137° C. It was molded to form various objects.

*Example 63.—CHDM (100% trans)+oxalic acid*

A mixture of 2.92 g. of diethyl oxalate (0.02 mole), 3.17 g. of trans-1,4-cyclohexanedimethanol (0.022 mole) and 4 drops of a 9.6% solution of titanium tetrabutoxide in n-butanol was heated at 180–190° C. to effect the alcoholysis. After the ethanol ceased to be evolved (twenty minutes), the temperature was increased to 220° C. and the pressure reduced to 1 mm. of mercury. The temperature was maintained at 220±5° C. and the reaction stirred under vacuum for one hour. The viscous melt was cooled under nitrogen. The polymer had a crystalline melting point of 205–210° C. and an inherent viscosity of 0.75.

*Example 64.—1,3-cyclohexanedimethanol +terephthalic acid*

A mixture of 4.85 g. (0.025 mole) of dimethyl terephthalate, 5.33 g. (0.037 mole) of 1,3-cyclohexanedimethanol and 4 drops of 14.4% NaHTi(OBu)$_6$ in butanol was heated for 30 minutes at 195–220° C. The temperature was raised to 275° C. and a vacuum carefully applied. After heating for 45 minutes at 275° C. under a vacuum of 0.1 mm., the polymer had an inherent viscosity of 0.35. It melted at 110–115° C. but did not flow appreciably until a temperature of 200° C. was reached. It could be used as a molding or extruding composition. It and other polyesters of this 1,3-isomer were useful as plasticizers for synthetic resins, cellulose esters, etc.

As is apparent from the above description of this invention there are various combinations of glycols and dicarboxylic acids which can be condensed, that is:

(A) CHDM (1,4-trans or 1,4-cis or mixtures thereof).

(B) Glycols (other than CHDM).

(C) Hexacarbocyclic para-linked dicarboxylic organic acids (e.g. terephthalic, trans-hexahydroterephthalic, p,p'-sulfonyldibenzoic, etc.).

(D) Bifunctional dicarboxylic organic acids (in lieu of or in addition to those of C).

The especially advantageous polyesters of this invention are derived from a glycol constituent which includes at least about 50 mole percent of A although as little as about 10 mole percent can also be employed. These polyesters melt at temperatures up to about 330° C. and can be used as molding compositions or extruded into fibers, films and other shaped objects.

A particularly advantageous class of these polyesters is derived from A condensed with C. These polyesters generally melt at temperatures of from about 250° to about 330° C. and can be formed into especially valuable oriented fibers or films.

Another particularly valuable class of these polyesters is derived from A condensed with C wherein a portion of either or both of A or C is replaced with B or D, respectively. By keeping the mole percentage of the total replacement to less than 50% of A or less than 50% of C or by keeping the sum of both replacements to a sum which is less than 50%, the modified polyesters so produced have melting points generally above 200° C. (often above 250° C.) and can be formed into quite valuable oriented fibers or films having modified characteristics such as improved elasticity, dye receptivity, reduced tendency toward static electrification, better adaptability for compression molding or extrusion, etc.

POLYESTER-AMIDES

The above detailed description and examples of the use of 1,4-cyclohexanedimethanol as a reactant in the preparation of polyesters can also be applied to the preparation of polyester-amides as is apparent to persons having ordinary skill in this art. However, there are distinct differences in properties created by the modifying effects of the amide linkages in the polymer molecules. Obviously, the polyester-amides are to be preferred when such modified properties are sought as in instances where higher moisture absorption, dyeability, etc., are desired. However, in many applications the presence of amide linkages is to be avoided as in attaining some electrical properties, stability toward certain reagents, and various other chemical and physical properties. Such variations in properties are also effected by the presence of blocks of polyester or polyamide linkages in the polymer molecules. These block polymers are less similar to polyesters than are the polyester-amides having somewhat random distribution of ester and amide links. In general, the use of 1,4-cyclohexanedimethanol produces its especially advantageous effects in polyesters. However, polyester-amides of exceptionally valuable properties can also be produced. Although there are quite distinct differences in the properties, the processes for preparing polyester-amides are generally quite similar to those for preparing polyesters. Thus, the bifunctional diamines can be employed in conjunction with the 1,4-cyclohexanedimethanol and this combination can then be condensed with a bifunctional dicarboxylic acid. Moreover, other modifications include the employment of bifunctional aminoalcohols, hydroxycarboxylic acids (already referred to above), and aminocarboxylic acids.

Examples of reactants which can be employed include hexamethylenediamine, ethylenediamine, 3-amino-2,2-dimethylpropanol, other aliphatic diamines, aromatic diamines such as benzidine and p-xylylene-α,α'-diamine, hydroxyethylamine, hydroxyoctamethyleneamine, other aliphatic and aromatic hydroxyamines such as p-xylylene- α-hydroxy-α'-amine, p-aminomethylbenzoic acid, 6-aminocaproic acid, and other aliphatic and aromatic aminocarboxylic acids, various hydroxycarboxylic acids as described hereinbefore, various dicarboxylic acids as also described hereinabove, and other known compounds of these types. Generally these bifunctional reactants contain from 1 to 20 carbon atoms and advantageously are analogous in basic molecular structure to the dicarboxylic acids and glycols illustrated by the polyester examples presented above.

These various reactants can be employed in various proportions and in various combinations (mixtures) as is apparent to those persons having ordinary skill in this art. Such persons are also acquainted with the processes, techniques and other factors involved in preparing such polyester-amides including various modifications such as is illustrated by U.S. Patent 2,547,113 and other similar prior art.

Thus, according to a particular embodiment of this invention there is provided a highly polymeric, linear polyester-amide having a molecular structure which contains a substantial proportion of recurring units having the following formula:

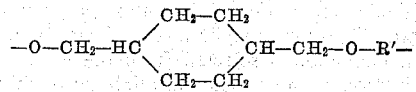

wherein the cyclohexane ring is selected from the group consisting of the cis and trans isomers thereof and R' represents an organic radical containing from 1 to 20 carbon atoms which is derived from a bifunctional carboxy compound, and (2) recurring units having the following formula:

$$-R^4-R'-$$

wherein R' has been defined above and $R^4$ represents an organic radical containing from 2 to 20 carbon atoms which is derived from a bifunctional amine.

Carothers in J. Am. Chem. Soc., 54, 1566 (1932), discusses polyester-amides which can be linear polymers containing molecules having more or less random mixtures of ester and amide linkages. Thus when dimethyl terephthalate is reacted with an equivalent amount of hexamethylenediamine an intermediate of the general formula

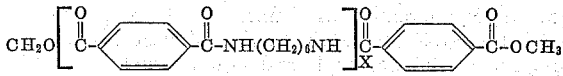

is obtained where $X=1$ or a small number. This intermediate can then be polyesterified in the usual manner with dimethyl terephthalate and 1,4-cyclohexanedimethanol to obtain linear polyesteramides which have improved dyeing qualities imparted by the presence of the amide linkage. A polyesteramide which consists of 20 mole percent

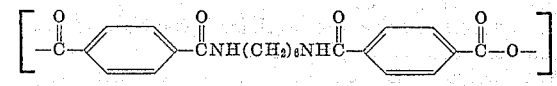

and 80 mole percent of this unit,

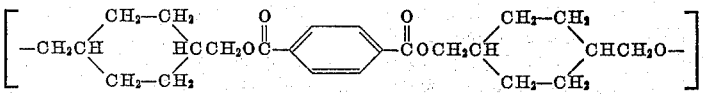

with an inherent viscosity of 1.07 had a melting point of 285–297° C. This material can be melt spun to give useful fibers.

This aspect of the invention can be further illustrated by the following examples of preferred embodiments, although it will be understood that these examples are included merely for purposes of illustration and are not intended to limit the scope of the invention unless otherwise specifically indicated:

*Example 65.—CHDM+terephthalic acid+hexamethylenediamine*

A mixture of 38.8 g. (0.2 mole) of dimethyl terephthalate, 14.6 g. (0.1 mole) of 79% aqueous hexamethylenediamine, 57.6 g. (0.4 mole) of 1,4-cyclohexanedimethanol (0.4 mole) and 25 ml. of butanol was placed in a 500 ml. 3-necked flask fitted with a stirrer, thermometer and a reflux condenser. The mixture was heated with a metal bath maintained at 110–118° for 72 hours to complete the ammonolysis reaction. The reflux condenser was replaced with a distilling head and 77.6 g. (0.4 mole) of dimethyl terephthalate and 86.4 g. (0.6 mole) of 1,4-cyclohexanedimethanol added. The temperature was increased to 175° C. and 10.7 ml. of 14.4% titanium tetrabutoxide in butanol added. The polyesterification was carried out in the usual manner by heating 1 hr. at 200–220° and then raising the reaction temperature to 285° C. A vacuum was carefully applied and maintained at 0.1–2.0 mm. for 5 minutes. The prepolymer thus obtained had an inherent viscosity of 0.19. It was polymerized in the solid phase at 250° for 3 hr. at 0.08 mm. to obtain an inherent viscosity of 1.07. The polymer was melt spun in conventional equipment to give a fiber which was cold drawn and heat stabilized.

*Example 66.—CHDM+sulfonyldibenzoic acid +tetramethylenediamine*

The process described in Example 65 was repeated except that an equimolar quantity of dibutyl p,p'-sulfonyldibenzoate was substituted for the dimethyl terephthalate and an equimolar quantity of tetramethylenediamine was substituted for the hexamethylenediamine thereby producing a polyester-amide essentially the same as in Example 65.

Other polyester-amides were prepared employing different reactants in a manner analogous to the various examples of polyesters presented hereinabove whereby products were produced having variations in properties similar to those resulting from varying the reactants employed in producing the analogous polyesters. For example, a polyester-amide was produced by inter-reacting 0.6 mole of diethyl isophthalate, 0.1 mole of benzidine and 1.0 mole of 1,4-cyclohexanedimethanol according to the procedure of Example 65.

Moreover, polyester-amides can be advantageously produced by first reacting an aminoalcohol with a dicarboxylic acid diester to form a N,N'-di(hydroxyalkyl)diamide such as N,N'-bis(hydroxyethyl)terephthalamide having the following formula:

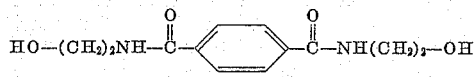

N,N' - bis(hydroxytetramethylene) - p,p' - sulfonylidibenzamide, N,N'-bis(hydroxyhexamethylene)adipamide, etc. Such a N,N'-di(hydroxyalkyl)diamide can then be polyesterified by using it in lieu of or as partially replacing one of the modifying glycols as described above in regard to preparing various polyesters. Thus, one part of such an N,N'-di(hydroxyalkyl)diamide can be polyesterified with 2–8 parts of dimethyl terephthalate and 1–7 parts (all by weight) of 1,4-cyclohexanedimethanol. Other proportions can also be employed.

*Example 67.—CHDM+terephthalic acid+N,N'-bis(hydroxyethyl)terephthalamide*

Various polyester-amides were prepared employing one part by weight of N,N'-bis(hydroxyethyl)terephthalamide, from 2–8 parts by weight of dimethyl terephthalate and from 1 to 7 parts by weight of 1,4-cyclohexanedimethanol. The techniques employed were the same as described hereinbefore and produced polyester-amides having melting points in the range of 225°–300° C. These polymers were useful in the preparation of fibers and films.

Polyesters derived from 1,4-cyclohexanedimethanol can be modified with "blocks" of diamides to further improve the dye adsorption properties, e.g. low molecular weight block polyamides were prepared by the methods given in U.S. Patents 2,547,113 and 2,691,006. Polyamides useful in these processes were prepared from any aliphatic or aromatic dicarboxylic acid and an aliphatic diamine. Also one can prepare a "block" polyamide by using aminoacids such as 6-aminohexanoic, 7-aminohexanoic, 2-methyl-6-aminohexanoic, etc. These block polyamides can be terminated in carboxyl groups, ester groups, or hydroxyl groups. These "blocks" can then be incorporated in the lower molecular weight polyesters by the usual procedures. The preferred compositions generally contain 10–25% by weight of the block polymer. The melting points of such compositions are generally between 250–300° C.

*Example 68.—CHDM+isophthalic acid +hexamethylenediamine*

A hexamethylene isophthalamide prepolymer with isophthalic acid end groups was prepared by first dissolving 81.2 g. (0.7 mole) hexamethylene diamine and 132.8 g. (0.8 mole; 14.3 mole percent excess) isophthalic acid in 200 ml. of water. The solution was evaporated on a steam bath to eliminate 80% of the water. The syrupy, homogeneous solution was next poured into a steel autoclave fitted with a glass liner. The autoclave was purged with nitrogen, sealed, and the contents heated at 250° C. for 2 hours. A clear, colorless resin was obtained. It was transferred to a reaction vessel equipped with a stirrer, an outlet tube, and an inlet for purified nitrogen. The polymer was sitrred at 240° C. in an atmosphere of purified nitrogen until most of the excess water had been removed. A vacuum of 0.3 mm. was then applied for 30 minutes at 240° C. The resulting polyamide prepolymer had a molecular weight of about 2000.

A block polymer containing alternating segments of polycyclohexylenedimethylene isophthalate and this polyamide was then prepared by placing 25 g. of the polyamide and 282 g. (2.0 moles) of 1,4-cyclohexanedimethanol in a flask and refluxing the glycol for several hours. The esterified polyamide was transferred to a reaction vessel equipped with a stirrer, a distillation column and an inlet for purified nitrogen, and 194 g. (1.0 mole) dimethyl isophthalate and a solution of 0.2 g. titanium tetrabutoxide in 10 ml. of butyl alcohol were also added. The mixture was heated until methyl alcohol was no longer evolved. The temperature was then raised to 250° C. and a vacuum of 0.2 mm. was then applied. This was stirred and the temperature increased thereby maintaining a highly viscous melt. After three hours a highly polymeric polyester-amide block polymer was obtained melting at about 270° C. The polymer was spun to form fibers and was formed into film.

Similar polyester-amide block polymers were prepared employing terephthalates, adipates, p,p'-sulfonyldibenzoates, octamethylenediamine, benzidine, etc. in conjunction with 1,4-cyclohexanedimethanol. These block polymers produce fibers which dye readily with cellulose acetate dyes, acid wool dyes, etc. Moreover they possess improved antistatic properties and other advantageous characteristics.

In the various formulas throughout this specification it is apparent that various symbols used are such that

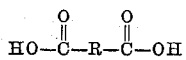

represents a hexacarbocyclic dicarboxylic acid wherein the carboxy radicals are attached to a hexacarbocyclic nucleus in a para relationship;

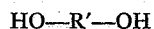

represents a bifunctional carboxy compound;

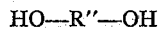

represents a bifunctional glycol;

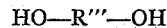

represents a bifunctional dicarboxylic acid; and

represents a bifunctional amine. The term bifunctional is well known in the art as illustrated in Carothers' patents such as U.S. 2,071,251, dated February 16, 1937.

Although the invention has been described in considerable detail with reference to certain preferred embodiments thereof, it will be understood that variations and modifications can be effected without departing from the spirit and scope of the invention as defined in the appended claims.

We claim:
1. A highly polymeric condensation polymer of (A) at least one dibasic carboxylic acid and (B) at least one bifunctional compound selected from the group consisting of dihydroxy compounds and aliphatic diamines, the relative proportions of (A) and (B) constituents being such as to constitute a polymer selected from the group consisting of polyesters and polyesteramides in which at least 50 mole percent of said bifunctional compound B consists of at least one member selected from the group consisting of the cis and trans isomers of 1,4-cyclohexanedimethanol, which polymer melts at above 100° C. and below about 330° C., has an inherent viscosity of at least 0.4 as measured in a mixture of 40% tetrachloroethane plus 60% phenol and is capable of being formed into fibers.

2. A polymer as defined by claim 1 which is a polyesteramide.

3. A polyesteramide as defined by claim 2 wherein (A) is terephthalic acid.

4. A polyesteramide as defined by claim 3 wherein (B) is 1,4-cyclohexanedimethanol and 1,6-hexamethylenediamine.

5. A polyesteramide as defined by claim 2 wherein (A) is trans-1,4-cyclohexanedicarboxylic acid and (B) is 1,4-cyclohexanedimethanol and 1,6-hexamethylene diamine.

6. A polymer as defined by claim 1 which is a polyester.

7. A polyester as defined by claim 6 wherein (A) is at least 50 mole percent of a hexacarbocyclic dicarboxylic acid wherein the carboxy radicals are attached to a hexacarbocyclic nucleus in a para relationship, which polymer melts at above 200° C.

8. A polyester as defined by claim 7 wherein said hexacarbocyclic acid is terephthalic acid.

9. A polyester as defined by claim 8 wherein (A) is terephthalic acid and (B) is 1,4-cyclohexanedimethanol.

10. A polyester as defined by claim 8 wherein (A) is terephthalic acid and (B) is 1,4-cyclohexanedimethanol and ethylene glycol.

11. A polyester as defined by claim 7 wherein (A) is said hexacarbocyclic acid and an aliphatic dicarboxylic acid.

12. A polyester as defined by claim 11 wherein (A) is terephthalic acid and succinic acid and (B) is 1,4-cyclohexanedimethanol.

13. A polyester as defined by claim 11 wherein (A) is terephthalic acid and sebacic acid and (B) is 1,4-cyclohexanedimethanol.

14. A polyester as defined by claim 7 wherein (A) is at least 50 mole percent trans-1,4-cyclohexanedicarboxylic acid.

15. A polyester as defined by claim 14 wherein (A) is trans-1,4-cyclohexanedicarboxylic acid and terephthalic acid and (B) is 1,4-cyclohexanedimethanol.

16. A polyester as defined by claim 7 wherein (A) is terephthalic acid and isophthalic acid and (B) is 1,4-cyclohexanedimethanol.

17. A polyester as defined by claim 6 wherein (A) is from 50 to 100 mole percent of an aliphatic dicarboxylic acid and the 1,4-cyclohexanedimethanol constituent is from 50 to 100% trans isomer.

18. A polyester as defined by claim 17 wherein (A) is 50 to 100 mole percent carbonic acid.

19. A fiber of the polymer defined by claim 1.
20. A fiber of the polymer defined by claim 2.
21. A fiber of the polymer defined by claim 6.
22. A fiber of the polymer defined by claim 8.
23. A fiber of the polymer defined by claim 9.
24. A film of the polymer defined by claim 1.
25. A film of the polymer defined by claim 2.
26. A film of the polymer defined by claim 6.
27. A film of the polymer defined by claim 8.
28. A film of the polymer defined by claim 9.
29. A fiber as defined by claim 21 wherein the 1,4-cyclohexanedimethanol is from 50 to 100% trans isomer.
30. A fiber as defined by claim 23 wherein the 1,4-cyclohexanedimethanol is from 50 to 100% trans isomer.
31. A film as defined by claim 26 wherein the 1,4-cyclohexandimethanol is from 50 to 100% trans isomer.
32. A film as defined by claim 28 wherein the 1,4-cyclohexanedimethanol is from 50 to 100% trans isomer.

References Cited in the file of this patent
UNITED STATES PATENTS

| | | |
|---|---|---|
| 2,048,774 | Bolton | July 28, 1936 |
| 2,437,046 | Rothrock | Mar. 2, 1948 |
| 2,478,261 | Frank | Aug. 29, 1949 |
| 2,551,731 | Drewitt et al. | May 8, 1951 |